May 15, 1951 J. L. COX 2,552,666
AUTOMOBILE TIRE VALVE
Filed Oct. 28, 1947

INVENTOR.
JAMES LOREN COX
BY
Besser and Harding
ATTORNEYS

Patented May 15, 1951

2,552,666

UNITED STATES PATENT OFFICE 2,552,666

AUTOMOBILE TIRE VALVE

James Loren Cox, Radnor, Pa.

Application October 28, 1947, Serial No. 782,575

1 Claim. (Cl. 137—69.5)

The object of my invention is to provide a valve for pneumatic tires which will function to establish and maintain in the tires an air-pressure not exceeding a predetermined maximum.

A preferred embodiment of the invention is shown in the accompanying drawings, in which—

Figures 1, 2:
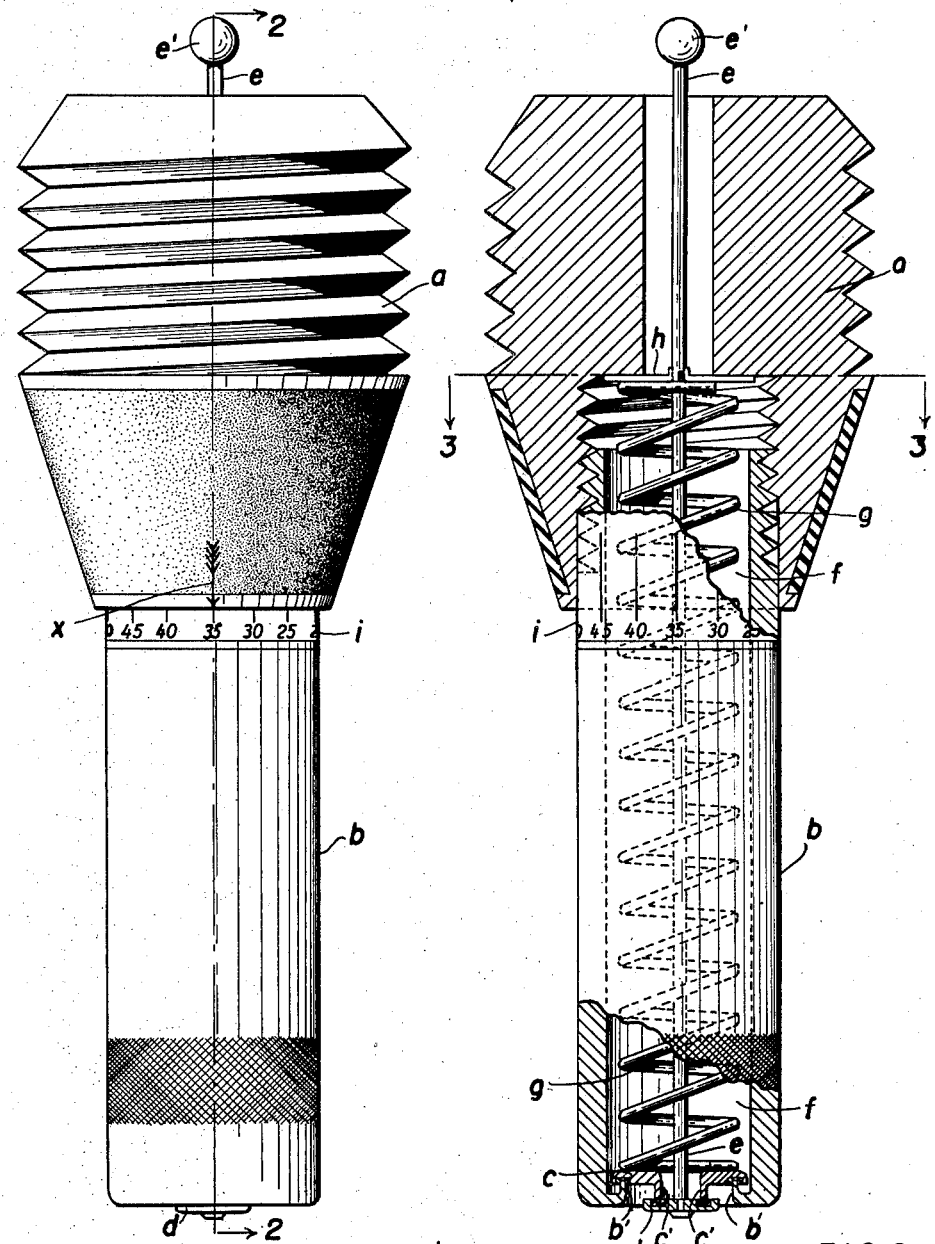
Figure 3:
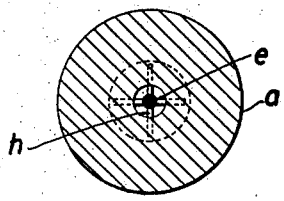

Fig. 1 is a side view of the valve. Fig. 2 is a view, largely in section, on the line 2—2 of Fig. 1. Fig. 3 is a cross-section, on a reduced scale, on the line 3—3 of Fig. 2.

A cylindrical valve chamber $b$ is at its outer air-admission end screw threaded into a head $a$ which is exteriorly threaded to engage the exterior thread on the stem or receiver, not shown. At its inner end the cylinder $b$ has an inwardly and upwardly extending flange $b'$ on which is seated an annular valve $c$ having an inner annular downwardly extending flange $c'$, on which is seated a valve $d$. Secured to valve $d$ is a rod $e$ extending through the longitudinal center or axis of the valve chamber and through an air passage $f$ extending through the outer part of the head $a$ and having at the outer end a knob $e'$. Secured to rod $e$ are outwardly extending arms $h$ which extend under and contact with the head $a$ at the outer end of the valve chamber $b$. Confined between the valve $c$ and the arms $h$ on the rod $e$ is a coil spring $g$.

The cylindrical valve chamber $b$ is turnable by hand on its axis to effect longitudinal movement of the valve chamber relative to the head $a$, thereby compressing the spring $g$ or allowing it to expand, in order to increase or diminish the pressure of the spring upon the valve $c$. On the exterior face of the valve chamber is an arcuate or circumferential indicator strip $i$ containing spaced apart numerals any one of which can be brought into registry with the arrow $x$. If, for example, it is desired to establish in the tire an air pressure of 35 pounds to the square inch, the valve chamber is turned on its axis until the numeral 35 registers with the arrow.

When the air pump is applied to the head $a$ in the usual manner, it pushes the rod $e$ longitudinally and unseats the valve $d$, thus admitting air to the tire while at the same time compressing the spring $g$. It is desirable to cease pumping air into the tire when the pressure therein exceeds the desired pressure of 35 pounds; but since the air pressure on the valves is balanced, the spring pressure continues to hold the air-release valve $c$ on its seat and continued operation of the air pump will increase the air pressure within the tire above that for which it is set. When, however, the air pump connection is released, the superior pressure upon the lower face of the valve $c$ will, against the pressure of the spring, unseat the valve $c$ and seat the valve $d$, allowing air to escape from the tire into the valve chamber. This escape of air continues until the air pressure within the tire is reduced to that for which it is set, at which time the spring pressure upon the valve $c$ is sufficiently strong to close the valve $c$ on its seat, the valves then assuming the positions shown in Fig. 2.

In normal use, due to exterior pressure upon the tire and to increase in temperature of the enclosed air, the air pressure within the tire may rise above the pressure that it is desirable to maintain therein. As soon as such pressure exceeds the counter-pressure of spring $g$, it becomes effective to unseat the valve $c$, allowing air to escape from the tire until the spring pressure upon the valve $c$ becomes effective to close it.

It will be understood from the above description that if, in pumping up the tire, an excess pressure is established therein it will automatically drop to the desired pressure upon the detachment of the air pump and that in normal use the pressure cannot rise above a predetermined maximum.

What I claim and desire to protect by Letters Patent is:

Valve mechanism engageable with a container, such as a pneumatic tire, which is adapted to establish and maintain different predetermined definite superatmospheric air pressures; said valve mechanism comprising a valve head containing an air-flow passage, a cylindrical valve chamber mounted for axial adjustment in said head and communicating at one end with said air passage and having an inwardly facing valve seat at the other end, an air-release valve in said chamber cooperating with said valve seat and having a port therethrough, an air-admission valve cooperating with the port through said release valve and adapted to open outwardly of said chamber, a rod, extending longitudinally within the valve chamber, one end portion of which includes means adapted to seat against said head and to the other end of which the air admission valve is secured and which is longitudinally movable to unseat the air-admission valve and allow air under pressure to flow outwardly of the chamber, a spring within and extending substantially throughout the length of the valve chamber, confined between said rod means and the air-release valve, said spring being compressible or expansible in the longitudinal adjustment of the valve chamber to hold the air-release valve on its seat against any air pressure not exceeding a maximum which is predetermined by such longitudinal adjustment, whereby when the air pressure exceeds said predetermined maximum it is effective to overcome said spring pressure and unseat the air-release valve and allow flow of said air, and cooperating indicating devices on said head and valve chamber adapted, in any axial adjustment of the valve chamber to compress or expand the spring, to indicate the pressure above which the air is effective to so unseat the air-release valve and below which the spring is effective to seat the air-release valve.

JAMES LOREN COX.

REFERENCES CITED

The following references are of record in the file of this patent:

UNITED STATES PATENTS

| Number | Name | Date |
|---|---|---|
| 2,246,775 | Anderson | June 24, 1941 |

FOREIGN PATENTS

| Number | Country | Date |
|---|---|---|
| 37,793 | Germany | of 1886 |
| 196,549 | Great Britain | Apr. 26, 1923 |